March 17, 1959 E. G. GRENINGER 2,877,490
JOINED ARTICLE
Filed Feb. 27, 1956

WITNESSES

INVENTOR
Elias G. Greninger
BY
ATTORNEY

United States Patent Office 2,877,490
Patented Mar. 17, 1959

2,877,490

JOINED ARTICLE

Elias G. Greninger, Stratford, Conn., assignor to The Bryant Electric Company, Bridgeport, Conn., a corporation of Connecticut Application February 27, 1956, Serial No. 568,074

5 Claims. (Cl. 16—121)

My invention relates to a new and improved joined article and more particularly to an article having a member which is placed in another member which other member is at an elevated temperature so that the first member is secured within the other member due to the forces of contraction evolved during the cooling of the other member.

The process of securing an insert within a plastic material by forcing the insert into an opening in the plastic material during the period the plastic material is in a pliable state and thereafter permitting the plastic material to cool is well known in the art. One common structure employed in such a process is to provide the insert with serrations so that the insert is more firmly held within the hardened plastic material. In general, however, such prior methods have employed plastic materials which have a high resiliency so that upon cooling fracture of the plastic material does not occur, and a strong bonding force is obtained. In many instances, it is desirable to use a plastic material which has a lower resiliency than the first discussed plastic materials in order to obtain the benefit of other physical properties of such lower resiliency plastic materials. However, with such lower resiliency plastic materials, an insert cannot be secured in the same manner as with the high resiliency materials due to the fact that the lower resiliency material cracks as it hardens around the insert. It is also desirable to support only one end of the insert in the plastic material in a manner so that the insert and the plastic material are in a definite predetermined alignment with each other. For example, in some electrical switching apparatus it is desirable to have an insulating plastic handle support an elongated electrical conductor in a definite manner so that movement of the plastic handle will cause a corresponding movement of the electrical conductor within a definite and fixed range. In such cases, the electrical conductor is provided with a moving contact or contact area for making and breaking electrical connections with one or more stationary electrical contacts. In order to provide an arc resistant area on the electrical conductor, it is customary to silver plate the electrical conductor. To mold a handle with the electrical conductor located in place has been impractical due to the fact that the heat of molding has caused deterioration of the silver plating. Therefore, if the conductor is molded in place, it is necessary that it be unplated and cleaned, subsequent to the molding operation, so that it may then be silver plated. Silver plating of the electrical conductor after molding in place has been satisfactory from an electrical standpoint but has entailed an additional manufacturing expense.

Accordingly, one object of my invention is to provide a new and improved article comprising a plastic member in which another member, in part, is located, with the other member having a plurality of outwardly extending means at least one of which means extends laterally outward so that the members will be held in alignment with each other when the other member is inserted into the plastic member.

Another object of my invention is to provide a new and improved article comprising a plastic member with an open ended slot therein in which another member, in part, is insertable, with the other member and the slot having laterally extending engageable locating means so that the members are held in alignment with each other.

Another object of my invention is to provide a new and improved article comprising a plastic member with an open ended slot therein in which another member, in part, is insertable, with the plastic member having engageable locating means extending laterally outward from the slot and laterally extending locating means on said other member which engage the locating means in the plastic member to hold the other member in alignment with the plastic member.

Another object of the invention is to provide a new and improved article comprising a plastic member with an open ended slot therein and another member insertable, in part, within the slot, the slot and the other member each having inwardly located means for locating said members with respect to each other, and the slot and the other member each having an engageable means for preventing the members from twisting with respect to each other.

These and other objects of my invention will become more apparent upon consideration of the following detailed description of a preferred embodiment of my invention, when taken in conjunction with the following drawings, in which.

Figure 1:
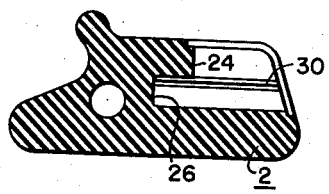
Figure 1 is a longitudinal sectional view of a handle constructed in accordance with the principles of my invention, taken substantially along the longitudinal center thereof.

As explained previously, the principles of my invention are ideally suited for constructing switch handles which support a movable switch blade. Accordingly, the embodiment of my invention shown in the drawings illustrates a switch handle 2 and a switch blade 4. It is to be realized, however, that such showing is purely illustrative and that the principles of my invention are equally applicable to other structures.

Figure 2:
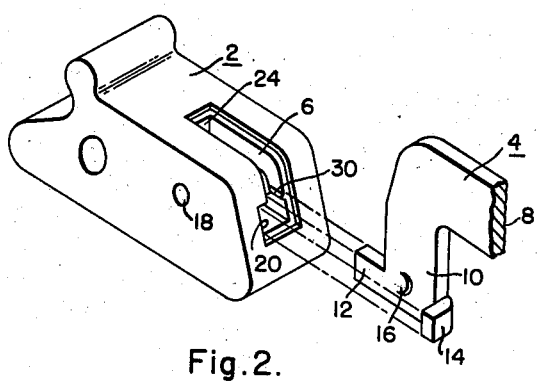
Fig. 2 is an exploded perspective view of the handle shown in Fig. 1 and a portion of an insertable contact member cooperable with the handle.

Referring to Figs. 1 and 2, it will be noted that the handle 2 is an elongated irregularly formed member having a slot 6 extending longitudinally inwardly from one of its ends. Although the entire handle 2 is illustrated, it will become apparent that the particular configuration of handle 2 is not related to the principles of my invention, and that the handle 2 may have any desired configuration as long as it is provided with the slot 6 as hereinafter described. Similarly, it will be noted that in Figs. 2 and 3 only that portion of the switch blade 4 which cooperates with the slot 6 in the handle 2 is shown, inasmuch as only that portion of the switch blade 4 need be constructed in accordance with the principles of my invention.

As shown, switch blade 4 comprises a flat arm 8, only a portion of which is shown, having an integral flat stem 10 extending laterally outwardly from one end of the arm 8. The stem 10 is provided at its free end with a projection 12 which extends outwardly from the outer side of stem 10 and in the same plane. The opposite side of stem 10 is provided with an integral projection 14 which extends laterally outwardly from one side of the stem 10. As shown, the lower edge of stem 10 and the projections 12 and 14 are in alignment with each other; however, such alignment is for the purpose of facilitating their formation and is not essential to my invention, as the projections 12 and 14 may be spaced at various locations longitudinally with respect to the stem 10. The stem 10 is also provided with an integral lance 16 which is located between the projections 12 and 14 and which extends laterally outward in the same direction as the projection 14.

Figure 3:
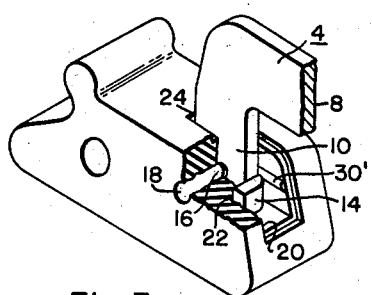
Fig. 3 is a perspective view of the handle and insert, shown in Fig. 2 assembled, with a portion of the handle being broken away.

Again, referring to Fig. 2, it will be noted that the handle 2 is provided with a circular opening 18 which extends laterally inwardly from one side of the handle 2 so as to intersect the side of slot 6 at a point spaced between the outer and inner ends of slot 6 and intermediate the depth thereof. The handle 2 is also provided with an undercut, longitudinally extending, open end notch 20 which is formed in one side of the slot 6 with its lower edge in longitudinal alignment with the lower longitudinally extending edge of the slot 6. The notch 20 extends outwardly into the same side of handle 2 as opening 18 in order to receive the projection 14 on the blade 4 when the blade 4 is inserted into the handle 2. As will be apparent, the inner end 22 of the notch 20 is spaced (Fig. 3) longitudinally outwardly from the opening 18 a distance equal to the spacing between the projection 14 and the lance 16. As shown in Fig. 1, the slot 6 is provided with an upwardly extending wall 24 which is located inwardly of the open end of slot 6 and is engageable with the outer edge of the stem 10 to limit the insertion of the stem 10 within the slot 6. It will be necessary, as shown in Fig. 3, that the wall 24 be spaced longitudinally inwardly with reference to the slot 6 from the inner end 22 of the notch 20, a distance equal to the longitudinal distance between the outer edge of the stem 10 and the surface of the projection 14 adjacent the stem 10. As is also shown in Fig. 1, the lower portion of the slot 6 extends further inwardly of the handle 2 in order to accommodate the inserted projection 12. Although not shown, it will be appreciated that the inner end 26 of the lower portion of the slot 6 is longitudinally spaced from the wall 24 a distance equal to the longitudinal distance between the outer edges of the projection 12 and the stem 10.

In order to accomplish the purposes of my invention the handle 2 must be formed from a suitable material which is in a relatively soft or pliable state at a temperature elevated above the normal ambient or room temperature. The material for the handle 2 must also be such that, when cooled from its pliable state to room temperature, it contracts to produce contraction forces which are sufficient to firmly hold the blade 4 in the slot 6 after the blade 4 has been inserted into the slot 6 during the period the handle 2 is in its pliable state. In addition, the handle 2 must be formed from an electrical insulating material, such as a phenolic molded material. However, as previously indicated, the principles of my invention are more particularly suited to lower resiliency molded materials such as phenol-aldehyde or polyester resins.

When a thermosetting resin is used for handle 2, the handle 2 may be molded and ejected from the mold and the molding will have sufficient cohesion of its molecules so that it will retain its molded shape. When ejected, such a molding would be at a temperature of approximately 150° centigrade (this temperature will obviously vary somewhat, dependent upon the particular resin and process employed) and then exists in a pliable state. In addition, the molding will remain pliable for a considerable range of temperatures as its temperature drops after ejection from the mold. Thus, the molding is still pliable at temperatures of about 110° C. At such a lower temperature the molding is sufficiently plastic so that a harder member may be inserted into a slot in the molding with only a minimum of distortion of the molding.

It will particularly be noted that the inserted member must be harder than the molding when the molding is in its pliable state. Thus, in the instant showing of switch blade 4, it is not necessary from the insertion standpoint that blade 4 be a metal. However, in view of the use of blade 4 in a switch as a current carrying member it is necessary that the blade 4 be an electrical conductor, such as an alloy of copper. If desired, however, the principles of my invention could be utilized to secure any member to the pliable molding which is harder than the pliable molding and which would not be adversely affected by the temperature, at which the molding exists, when the harder member is inserted.

With these principles in mind it will be seen that the stem 10 of the blade 4 may be forced longitudinally from the open end of slot 6 into the slot 6 of handle 2 when the handle 2 is in its pliable state. In order to obtain a good holding force slot 6 is made slightly narrower in width than the greatest lateral thickness of the blade 4. It will be obvious that the greatest lateral thickness of the blade 4 will comprise the thickness of the blade 4 plus the distance the lance 16 extends laterally from the side of the blade 4. When the blade 4 is inserted into the handle 2 the edge of lance 16 will cause a small portion of the material in the slot 6 of the pliable handle 2 to be forced outwardly away from the stem 10. Such insertion of stem 10 will continue until the outer end of projection 12 engages the wall 26, at the same time the outer edge of stem 10 engages the wall 24 and at that point the lance 16 is in alignment with the opening 18, and the surface on the projection 14 adjacent the side of stem 10 engages the inner end 22 of the notch 20. Once such insertion has occurred, handle 2 may be permitted to age or cool naturally down to room temperature which will cause the handle 2 to shrink around the portions of stem 10 in slot 6 and to harden. In view of the fact that the handle 2, in its pliable state, may be at a fairly low temperature, that is, for example 110° C., when the blade 4 is inserted, any silver plating on the blade 4 will not be adversely affected. Accordingly, no further fabrication processes of either the handle 2 or the blade 4 are necessary.

During cooling of the handle 2, the material of the handle 2 will shrink around the lance 16 and the projection 14. As the lance 16 has its laterally outwardly extending end facing projection 14, said shrinkage will form a shoulder therebetween so that the blade 4 cannot be withdrawn from the slot 6 in the reverse manner without exerting a pulling force which is sufficient to rupture the hardened material of the cooled handle 2.

In addition shrinkage of the handle 2 will occur around the projections 12 and 14 so that they are securely seized within the handle 2. Inasmuch as projection 12 is in alignment with the stem 10, the blade 4 will not become loose due to forces applied to the blade 4 which would tend to rock the blade 4 longitudinally within the slot 6. Similarly as projection 14 extends laterally from the stem 10, the blade 4 will not become loose due to forces applied to the blade 4 which would tend to twist the blade 4 laterally within the slot 6. Thus, the combination of shrinkage around the projections 12 and 14 and the lance 16 prevents the blade 4 from being withdrawn from or loosened within handle 2. Further as there is only a slight interference between the lance 16 and the side of slot 6 which is for a relatively small distance, that is, from the inner end 22 of notch 20 to the opening 18, the blade 4 may easily be inserted within the handle 2.

In the preferred embodiment of my invention shown, the inner surface of the slot 6 (Fig. 2) opposite the surface which intersects the opening 18, is provided with an approximately centrally located longitudinally extending ridge 30. As before, the width of the slot 6, from the free edge of the ridge 30, to the side of the slot 6 is only slightly less than the greatest thickness of the blade 4. In view of the fact that only the free edge of ridge 30 engages the side of the stem 10, the interference between the handle 2 and the stem 10 can be slightly increased without resulting in any substantial resistance by the handle 2 to the insertion of the stem 10. By so increasing the interference a tighter bond between the handle 2 and stem 10 can be obtained. Also, as the increased interference is obtained by a ridge 30, cracking of the handle 2 will not occur when handle 2 cools due to the space between the sides of slot 6 and stem 10 on the ridge 30 side of handle 2. As shown in Fig. 3 insertion of the stem 10 into the slot 6 causes the ridge 30 to be deformed so that it is flattened to the form of a ridge 30'. In order to provide the ridge 30, as described, it is necessary that the projection 14 and the lance 16 extend laterally outwardly from the stem 10 in a direction to engage the other side wall of the slot 6. If, however, a ridge 30 is not utilized, the projection 14 and the lance 16 with their cooperable structure on the handle 2 may be located on opposite sides of the stem 10.

From this description of my invention it will be seen that I have provided a simple structure whereby one part, which is harder than another part of the plastic state, may be firmly secured in a definite alignment to the other part by merely being inserted therein and letting the pliable part cool to a hardened condition. Accordingly, having described a preferred embodiment of the invention in accordance with the patent statutes, it is desired that the invention be not limited to the specific consruction illustrated, inasmuch as it will be apparent that many modifications, in addition to those specifically pointed out herein, may be made without departing from the broad spirit and scope of this invention. Accordingly, it is desired that this invention be interpreted as broadly as possible and that it be limited only as required by the prior art.

I claim as my invention:

1. An article of manufacture comprising, a first member of a material which is pliable at temperatures sufficiently above normal ambient temperature and which contracts to a hardened state when cooled to a normal ambient temperature, an elongated slot extending inwardly of said first member from one side thereof, said slot having at least one enlarged portion extending laterally therefrom on at least one side at a location spaced inwardly from its open end, said first member having an integral ridge of limited cross-section area which extends inwardly of said slot and longitudinally thereof, a second member of a material harder than said first member when said first member is in said pliable state having at least a portion of a thickness slightly less than the width of the slot and slightly greater than the distance between the free edge of said ridge and the opposite side of said slot, and said portion of said second member having a lateral projection located to be received in said enlarged portion of said slot when said second member is inserted within said slot with said first member being in a pliable state whereby the free edge of said ridge is deformed so that upon cooling of said first member said members are rigidly secured together.

2. An article of manufacture comprising, a first member of a thermosetting resin, an elongated slot extending inwardly of said first member from one end thereof and opening at one side of said first member, said slot being enlarged laterally on at least one side at a location spaced inwardly thereof, said slot also being enlarged laterally on at least one side which latter enlarged portion is spaced outwardly from said first-mentioned enlarged portion and extends to said one end of said first member, a second member of a material harder than said first member when said first member is in said pliable state having at least a portion of a thickness slightly greater than the width of said slot, spaced projections extending laterally outwardly from said portion of said second member, said projections located so as to be closely received within said enlarged portions of said slot, respectively, when said second member is inserted within said slot from said one end thereof with said first member being in a pliable state so that upon cooling of said first member said first and second members are secured together.

3. An article of manufacture comprising, a first member of a material which is pliable at temperatures sufficiently above normal ambient temperature and which contracts to a hardened state when cooled to a normal ambient temperature, an elongated slot extending inwardly of said first member from one end thereof and opening at one side of said first member, said slot being enlarged laterally on one side at a location spaced inwardly thereof, said slot also being enlarged laterally on said one side which latter enlarged portion is spaced from said first-mentioned enlarged portion and extends to said one end of said first member, said first member having an integral ridge portion of limited cross-section area which extends inwardly of said slot and longitudinally thereof, a second member of a material harder than said first member when said first member is in said pliable state having at least a portion of a thickness slightly less than the width of said slot and slightly greater than the distance between the free edge of said ridge and the opposite side of said slot, spaced projections extending laterally outwardly from said portion of said second member, said projections located so as to be received within said enlarged portions of said slot, respectively, when said second member is inserted within said slot from said one end thereof with said first member being in a pliable state so that upon cooling of said first member said first and second members are secured together.

4. An article of manufacture comprising, a first member of a material which is pliable at temperatures sufficiently above normal ambient temperature and which contracts to a hardened state when cooled to a normal ambient temperature, an elongated slot extending inwardly of said first member from one side thereof, said first member having an integral ridge of limited cross-section area which extends inwardly of said slot and longitudinally thereof, a second member of a material harder than said first member when said first member is in said pliable state having at least a portion of a thickness slightly less than the width of the slot and slightly greater than the distance between the free edge of said ridge and the opposite side of said slot, so that when said second member is inserted longitudinally into said slot with said first member being in a pliable state the free edge of said ridge will be deformed so that upon cooling of said first member said members are rigidly secured together.

5. An article of manufacture comprising, a first member of a material which is pliable at temperatures sufficiently above normal ambient temperature and which contracts to a hardened state when cooled to a normal ambient temperature, an elongated slot extending inwardly of said first member from one end thereof and open at one side of said first member from said one end to a point adjacent to but spaced from the inner end of said slot, said slot having at least one recess on at least one side wall thereof at a location adjacent its outer end and opening at its outer end, a second member of a material harder than said first member when said first member is in said pliable state and having a laterally extending end portion of a thickness slightly greater than the width of said slot, and said portion of said second member having a lateral projection located so as to be received within said recess and a projection adapted to be received in the inner closed end of said slot when said second member is inserted within said slot from said one end of the first member and projecting through the open side of the slot and with said first member being in a pliable state so that upon cooling of said first member said first and second members are secured together with the end portion of said second member received in said slot and projecting through the open side of said slot.

References Cited in the file of this patent

UNITED STATES PATENTS

| | | |
|---|---|---|
| 1,714,708 | Winning | May 28, 1929 |
| 1,791,798 | Coen | Feb. 10, 1931 |
| 2,182,007 | Tegarty | Dec. 5, 1939 |
| 2,216,467 | Falk | Oct. 1, 1940 |
| 2,285,963 | Gits | June 9, 1942 |
| 2,314,021 | Sladky | Mar. 16, 1943 |
| 2,635,328 | Larmour | Apr. 21, 1953 |
| 2,679,913 | Scott | June 1, 1954 |